H. L. LOWMAN.
Miner's Pick.
No. 2,167. Reissued Feb. 6, 1866.
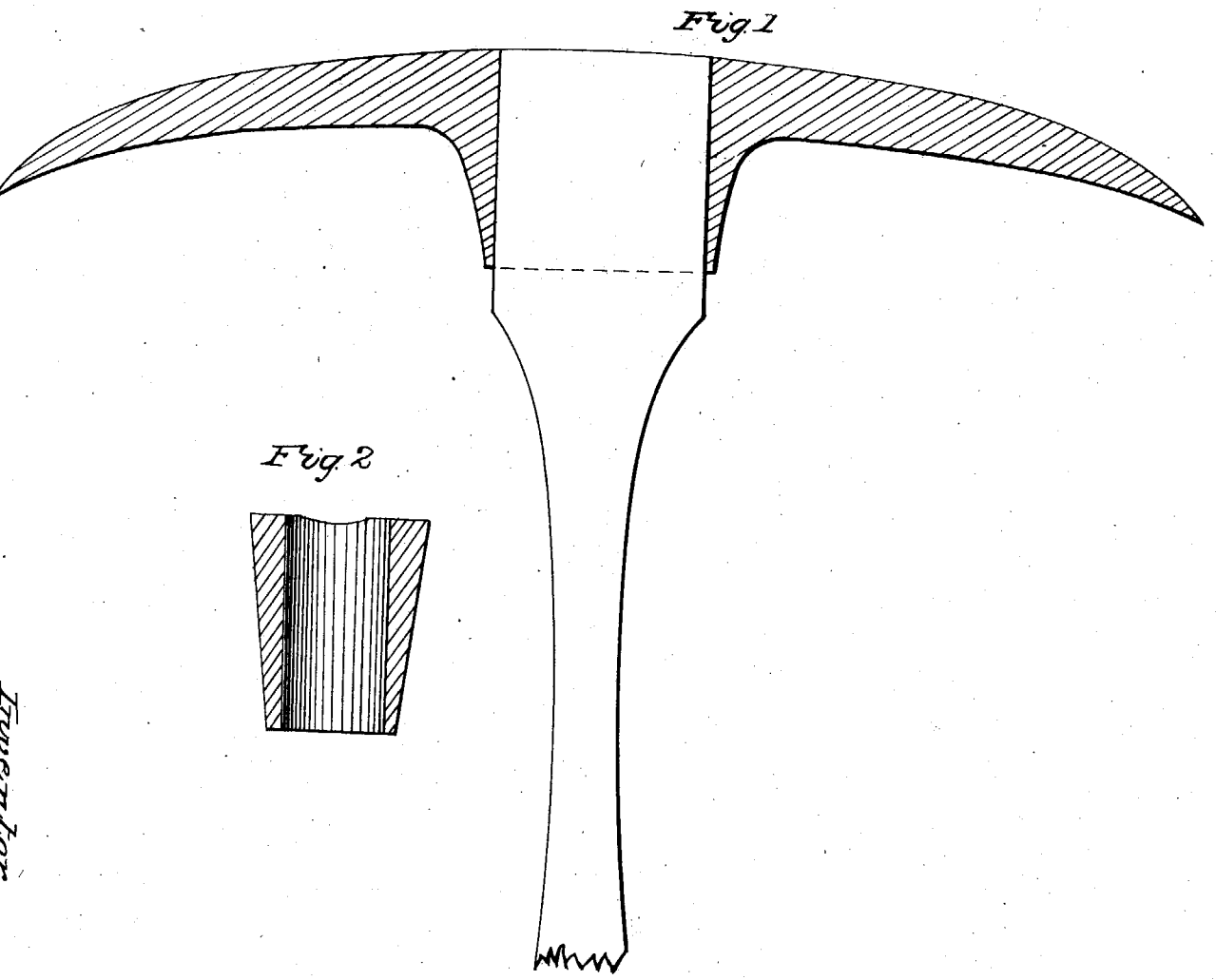
Witnesses
Delamus Clough
Alex A. G. Manuel
Inventor
H. L. Lowman
N. PETERS. Photo-Lithographer, Washington, D. C.

UNITED STATES PATENT OFFICE.

THE WASHOE TOOL COMPANY, OF NEW YORK, N. Y., ASSIGNEE OF H. L. LOWMAN.

IMPROVEMENT IN TOOLS.

Specification forming part of Letters Patent No. 48,080, dated June 6, 1865; Reissue No. 2,167, dated February 6, 1866.

*To all whom it may concern:*

Be it known that HARVEY L. LOWMAN, of Virginia City, in the county of Storey and State of Nevada, made a new and useful Improvement in Mining Picks and other tools, of which the following is a full, clear, and exact description, reference being had to the accompanying drawings, which are made part of this specification, and in which—

Figure 1 represents a miner's pick, illustrating said improvement by a longitudinal sectional view through the pick, showing the helve or handle in elevation. Fig. 2 is a transverse central section across the eye of the pick.

The same letters refer to like parts in the different figures, and to enable one skilled in the branch of industry appertaining to this invention to construct and use the same, I will proceed to describe it as applied to a miner's pick.

The objects of the improvement do not distinguish it from other inventions of the same class which have preceded it. These are strength and stability. The first is due to the proportion of the parts, and the second to the method of attachment of the helve or handle. It is practically useless to endeavor to attain one without the other, for both are necessary to a satisfactory result and the two features are therefore treated as combined to produce as near a perfect result as the nature of the case will permit. While treating of the two features separately, the claim is and will be based upon their combination, a tool thus constructed being better, stronger, and more stable than any other.

The eye of the pick is made of elliptical form, of an even size throughout its whole length, and the latter is increased, as shown in the drawings, making a raised eye, which in addition to prolonging the grasp upon the helve has two other effects, each in itself desirable namely: First, increasing the weight of metal at the middle of the tool, and second, forming an elongation transversely to the general trending line of the pick, so as to receive the junction of each bit or end of the pick by a gradual curve, instead of by an angular or shouldered junction. The particular form given to the cutting end of the tool may be varied to suit the work to be done. The vibration of the bit of the pick in its ordinary percussive action is ultimately expended at the point where it springs out of the central boss or head, and the tendency to rupture at this point is both theoretically and practically demonstrable. By a gradual mergence of the bit into the head, no absolute line of fracture is anticipated or provoked, as is the case in the square-shouldered bit, which distinctly vibrates upon the line of junction with the central boss. The end of the helve is not split, wedged, or otherwise spread, but is intended to fit and fill the hole, *per se*, as does the whole length of the portion embraced by the eye. In this connection it can be readily withdrawn by a direct blow, suitably applied upon the helve, but withstands in a surprising and highly satisfactory manner the jar incident to the blow received transversely to the axis of the helve.

It is manifest that this mode of constructing the eye and merging the bit by curved lines into the socketed head is applicable to other tools as well as miners' picks.

Having thus described the invention, what is claimed therein as new, and desired to be secured by Letters Patent, is—

An elliptical socket, the opposite sides of which are parallel to each other and elongated in the line of its axis, in combination with one or more projecting arms or bits merging by curved lines into the socketed head, substantially as described and represented.

WASHOE TOOL COMPANY,
By H. M. HAMILTON,
*President.*

Witnesses:
EDWARD H. KNIGHT,
OCTAVIUS KNIGHT.